(12) United States Patent
Otero et al.

(10) Patent No.: US 7,305,361 B2
(45) Date of Patent: Dec. 4, 2007

(54) APPARATUS, METHODS AND ARTICLES OF MANUFACTURE FOR CONSTRUCTING AND EXECUTING COMPUTERIZED TRANSACTION PROCESSES AND PROGRAMS

(75) Inventors: Hernan G. Otero, Huntington, NY (US); Steven B. Horn, New York, NY (US); John Tumilty, New York, NY (US)

(73) Assignee: Goldman Sachs & Co., New York, NY (US)

( * ) Notice: Subject to any disclaimer, the term of this patent is extended or adjusted under 35 U.S.C. 154(b) by 1179 days.

(21) Appl. No.: 09/845,138

(22) Filed: Apr. 30, 2001

(65) Prior Publication Data
US 2002/0046149 A1    Apr. 18, 2002

Related U.S. Application Data

(63) Continuation-in-part of application No. 09/823,125, filed on Mar. 30, 2001, which is a continuation-in-part of application No. 09/773,139, filed on Jan. 31, 2001.

(60) Provisional application No. 60/241,807, filed on Oct. 14, 2000.

(51) Int. Cl.
*G06Q 40/00* (2006.01)
(52) U.S. Cl. .......................................... 705/36; 705/35
(58) Field of Classification Search .................. 705/37, 705/34, 35
See application file for complete search history.

(56) References Cited

U.S. PATENT DOCUMENTS

| | | | |
|---|---|---|---|
| 5,434,395 A | 7/1995 | Storck et al. | |
| 5,802,502 A * | 9/1998 | Gell et al. | 705/37 |
| 5,918,218 A | 6/1999 | Harris et al. | |
| 5,950,176 A | 9/1999 | Keiser et al. | |
| 6,016,483 A * | 1/2000 | Rickard et al. | 705/37 |
| 6,026,440 A | 2/2000 | Shrader et al. | |
| 6,061,665 A * | 5/2000 | Bahreman | 705/40 |
| 6,119,104 A | 9/2000 | Brumbelow et al. | |
| 6,134,535 A * | 10/2000 | Belzberg | 705/37 |
| 6,233,609 B1 * | 5/2001 | Mittal | 709/219 |
| 6,377,939 B1 * | 4/2002 | Young | 705/34 |
| 6,421,653 B1 * | 7/2002 | May | 705/37 |
| 6,615,188 B1 * | 9/2003 | Breen et al. | 705/37 |

FOREIGN PATENT DOCUMENTS

WO    WO 01/98965    * 12/2001

OTHER PUBLICATIONS

In re Harza 124 USPQ 378 (CCPA 1960).*

* cited by examiner

*Primary Examiner*—Jagdish N Patel
(74) *Attorney, Agent, or Firm*—Buckley, Maschoff & Talwalkar LLC

(57) ABSTRACT

Open-ended apparatus, methods and articles of manufacture for constructing and executing transaction processes and programs are shown. These apparatus, methods and articles of manufacture are primarily used in computerized trading processes. They are constructed using object oriented languages, and comprise one or more plug ins inserted into a logic engine to be used in computerized trading. The plug ins may be predetermined, or constructed as desired.

30 Claims, 10 Drawing Sheets

Figure 3

APPARATUS, METHODS AND ARTICLES OF MANUFACTURE FOR CONSTRUCTING AND EXECUTING COMPUTERIZED TRANSACTION PROCESSES AND PROGRAMS

CROSS-REFERENCE TO RELATED APPLICATIONS

This application is related to provisional application U.S. Ser. No. 60/241,807, by Steven B. Horn, John A. Fanelli, Hernan G. Otero and John Tumilty, which disclosure is incorporated herein by reference; and co-pending U.S. application Ser. No. 09/773,139, entitled "APPARATUS, METHODS AND ARTICLES OF MANUFACTURE FOR CONSTRUCTING AND EXECUTING COMPUTERIZED TRANSACTION PROCESSES AND PROGRAMS" filed on Jan. 31, 2001, by Hernan G. Otero, Steven B. Horn and John Tumilty, which disclosure is incorporated herein by reference; and co-pending U.S. application Ser. No. 09/823,125, entitled "APPARATUS, METHODS AND ARTICLES OF MANUFACTURE FOR CONSTRUCTING AND EXECUTING COMPUTERIZED TRANSACTION PROCESSES AND PROGRAMS" filed on Mar. 30, 2001, by Hernan G. Otero, Steven B. Horn and John Tumilty, which disclosure is incorporated herein by reference.

FIELD OF THE INVENTION

This invention relates to apparatus, methods and articles of manufacture for computerized transaction execution and processing. More particularly, this invention relates to apparatus, methods and articles of manufacture for client-server transaction execution and processing.

COPYRIGHT RIGHTS

A portion of the disclosure of this patent document contains material which is subject to copyright protection. The copyright owner has no objection to the facsimile reproduction of the patent document or the patent disclosure, as it appears in the Patent and Trademark Office patent files or records, but otherwise reserves all copyright rights whatsoever.

BACKGROUND OF THE INVENTION

Computerized transaction execution and processing requires an enormous amount of time and resources. The time and resources are required because, in most instances, execution and processing are based upon customized implementations of the transaction.

Customized transaction implementations require new programming. New programming requires cost and effort—not only for the first attempt, but also for the debugging and testing processes. Moreover, once the program is debugged and released, real world implementations require yet further testing and debugging.

One approach to simplifying programming effort is through object oriented programming (OOP). OOP methods encapsulate, or bind together, data and the methods that operate on data through the use of objects which can be copied, modified, manipulated, linked together, etc. The objects are usually grouped in object classes that have attributes such as data values and methods (functions). An OOP approach to programming usually produces results in less time and with less resource cost than previous programming approaches.

OOP also uses frameworks in an effort to further reduce program development costs. A framework is a set of OOP classes that embodies a predetermined set of attributes and methods for providing a common group of behaviors. An application program developer utilizes the framework and builds upon it, adding subclasses and attributes and modifying methods depending on the problem to be solved. The framework developers have to arrive at a set of classes and methods that will best provide the desired problem solution and will accept the most likely framework extensions.

Despite the availability and benefits usually obtained by OOP, few if any OOP objects, object classes and frameworks exist in the computerized transaction processing area. This lack of OOP tools may be for any number of reasons. For example, any type of programming takes resources and time. It takes resources because the programmers must first develop the program with input from the users, and then the users themselves must test the program in the field, to ensure reliable operation. The effort required means that the users may be too busy doing their job to assist in programming efforts. Thus the program may not ever be developed. Moreover, by the time any particular program is developed, the markets may have shifted away from the initial transactional conditions that first provided the impetus for developing the program. For example, specific trading strategies are usually constructed and executed on a customized basis, yet by the time the program is developed for those strategies, and those strategies are executed, they may be no longer useful.

The cost, effort and time factors are not solely the result of required programming. In trading transactions, the programmers must be advised by the traders or other business professionals regarding desired trading strategies and desired markets. These professionals are busy in their own right—they may have little or no time to advise the programmers on what new strategies and markets should be developed. Even if they can advise the programmers, trading strategies can become quite complex, and in order to communicate those strategies and implement those strategies effectively, the programmer and trader interactions cost time, money and resources.

Enterprise-wide customization adds yet another level of time, effort and complexity. What may be useful in one enterprise business unit may not be useful in another, and time, effort and resources may not be available to implement specific programs customized for each business unit.

Finally, any implementations must be quite robust, and reliably and consistently execute trading strategies. The implementation of new computerized transactional programs must be as close to bullet proof as possible—failure of a trading program can mean losses in thousands, millions or even billions of dollars. Developing reliable implementations of trading programs means that testing procedures and recovery procedures must always be paramount considerations.

Thus, the art has heretofore lacked effective, efficient programming tools, whether in OOP or otherwise.

Therefore, it is an object of this invention to provide an OOP programming tool or tools to allow users to more quickly develop, construct and execute computerized transactions.

It is a further object of this invention to provide robust and reliable apparatus, methods and articles of manufacture for implementing trading strategies.

BRIEF DESCRIPTION OF THE DRAWINGS

FIG. 3 is a screen shot of a preferred embodiment.

SUMMARY OF THE INVENTION

Figure 1:
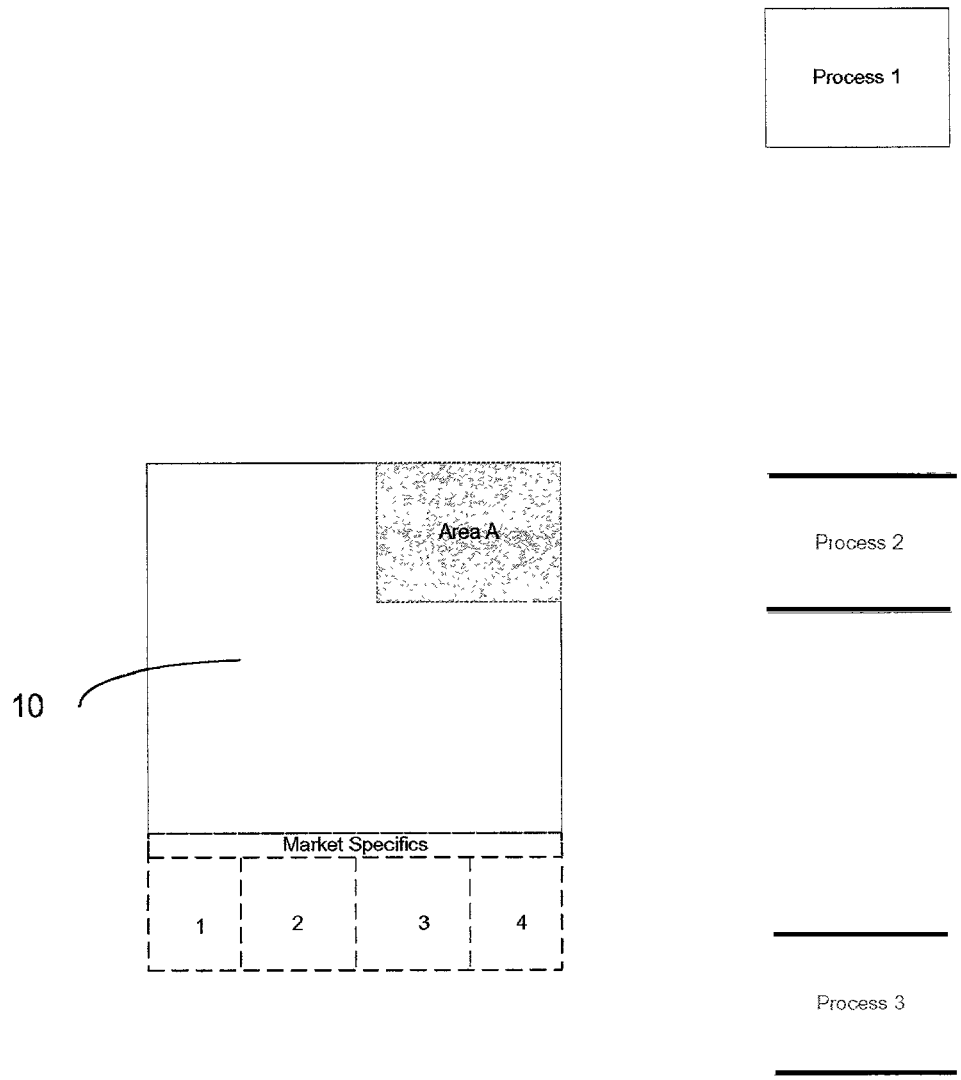
FIG. 1 is a schematic diagram of a preferred embodiment.

The present invention provides apparatus, methods and articles of manufacture for constructing and executing computerized transaction processes. In the preferred embodiments, an engine is used that permits "plug-ins" to be used for construction, modification and alteration of trading procedure execution. These plug-ins can be pre constructed, or constructed when appropriate, and applied to the engine when desired. These plug ins are constructed by using Objects, and tools, framework, and class libraries are made available to simplify the plug in construction.

In the preferred embodiments, the plug-ins comprise two types. The first type comprise algorithms used in trading. The second type comprise market-specific rules. Thus, for example, in the preferred embodiments, the engine can be configured with a specific algorithm and for a specific market for a first trade and then modified for another specific algorithm and another specific market for a second trade. In the especially preferred embodiments, the engine will carry out a number of trades using a specific algorithm, which has been chosen from a set of preconfigured algorithms. Moreover, the market plug-ins, having been set upon installation for use in a particular market, will be maintained for a predetermined or static period of time. Both market and algorithm plug ins are constructed from objects. Various object classes are disclosed as well as methods for combining the classes.

The classes comprise, in the preferred embodiments; an Algorithm package for executing customized trading strategies, an Event package for implementation of different event interests that are supported by the computerized trading system, an Action package for implementing actions that are to be taken by the computerized trading system; an Order Execution of an Exchange package of classes for connecting to different exchanges an Input package of classes to implement the input driver for the engine object, a Local package that contains classes that pertain to the location of the exchanges of interest, a Logic package that provides the program's logic engine implementation classes, a Tools package that contains classes that provide administrative tools, and a Finutil package that contains financial application utility classes.

DETAILED DESCRIPTION OF THE PREFERRED EMBODIMENTS

The preferred embodiments of the present invention provide apparatus, methods and articles of manufacture that have a number of characteristics in order to provide open-ended construction and execution of computerized trading processes. The preferred embodiments are constructed in Java®, which is essentially a platform independent language. Standard Java® features are used in order to permit consistency among various Java® versions. Javadocs, as well as the tracking application CVS, permits convenient tracking of modifications and revisions of these embodiments. Of course, other embodiments may be translated into other languages. Therefore, the embodiments may be used across a wide variety of networked platforms.

FIG. 1 shows a schematic diagram of a preferred embodiment. At 10 is shown the engine infrastructure of the preferred embodiment. Written in Java®, and present on the server, this software enables various data, plug-ins, applications, processes, and algorithms to be used in order to customize the trading process. These data, plug-ins, applications, processes, and algorithms are imported or plugged into the engine as desired in order to implement a particular trading strategy.

Seen in FIG. 1 are various processes to be used in the engine 10. Area A of engine 10 symbolizes the area in which the plug-ins can be placed. Also seen at 10 is an area labeled "Market Specifics." This area, also supporting customization through data, plug-ins, applications, processes, and algorithms permits customization of any particular algorithm for any particular market in a manner explained in further detail below. In other embodiments, the plug-ins used for the various areas can be internal or external to the engine. Hereinafter, "plug-ins" will be used as a general term for data, plug-ins, applications, processes, and algorithms.

Engine 10, in this embodiment, provides services for the plug-ins. For example, most trading strategy plug-ins will need to access market data. Most trading strategy plug-ins will need to send orders to the exchange and be notified of executions, etc. Engine 10 provides these and other services to the plug-ins. For example in a preferred embodiment, engine 10 provides:

A real time market data feed driver (e.g. Reuters SSL, TIB/Rendezvous feeds.)
An exchange driver where the algorithm sends orders and receives executions back.
A driver implementation that sends orders to one or more order management architecture(s) and/or system(s) server(s) is provided.
An input driver which enters requests to the engine 10.

Figure 2:
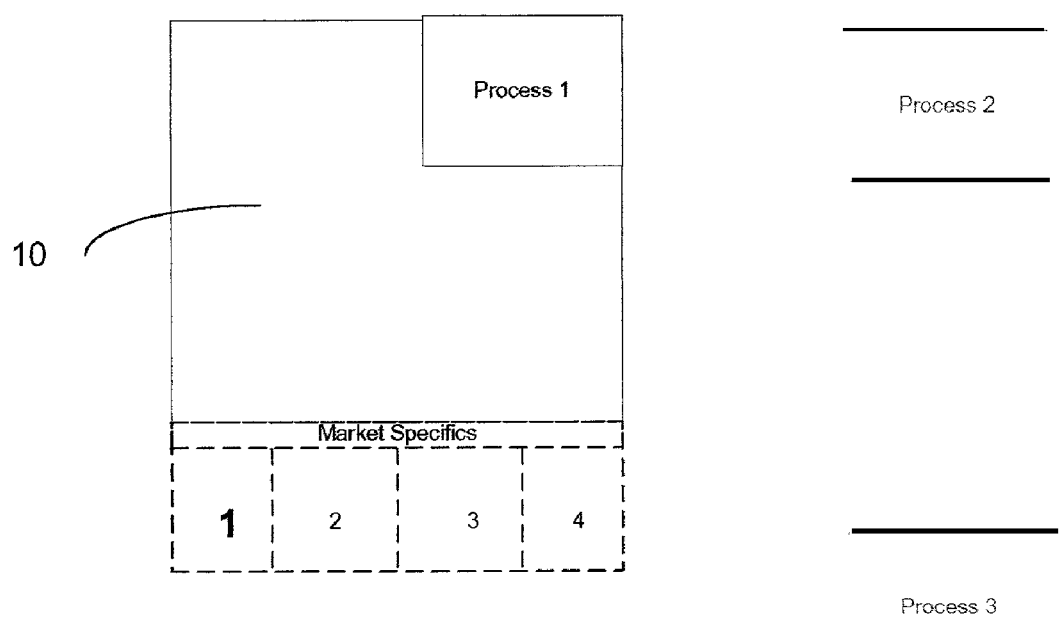
FIG. 2 is a schematic diagram of a preferred embodiment.

FIG. 2 shows Process 1 implemented in engine 10. Process 1 might be a trading process such as Volume-Weighted-Average-Price or VWAP. The VWAP algorithm used in this embodiment, attempts to match the VWAP for a given instrument, such as an equity throughout a specified lifespan (e.g. throughout the full trading day). VWAP will maintain a number of limit orders in the market at different price levels. In order to trade according to the VWAP algorithm of this embodiment, the engine will listen to market data throughout the day and access a volume profile to match the day's VWAP as close as possible.

The trader will then be able to review, through his screen, the order as it is being executed according to the VWAP algorithm. Any updates and/or changes will be simply made through his or her screen.

If a second VWAP algorithm was desired to be used, such as one that is based on theoretical values to trading, this second plug-in can be substituted for the first in the engine. This second plug-in will then be used by the engine.

Returning to FIG. 2, the Market Specifics plug-in 1 has been chosen. Market specifics provide specific variables, data and other plug-ins necessary for the specific market in which the embodiment is being used. For example, there may be different limits on trading volume in one market versus another. The preferred embodiments permit configuration and modification of these Market Specifics, by plug-ins, so that they may be used in a variety of markets as desired.

In the preferred embodiments, the plug-ins comprise two types. The first type comprise algorithms used in trading. The second type comprise market-specific rules. Thus, for example, in the preferred embodiments, the engine can be configured with a specific algorithm, such as a first VWAP algorithm and for a specific market for a first trade such as the New York Stock Exchange and then modified for another specific algorithm such a Ratio algorithm and another specific market such as the Tokyo Stock Exchange for a second trade. In the especially preferred embodiments, the engine will carry out a number of trades using a specific algorithm, which has been chosen from a set of preconfigured algorithms. The algorithm used may be parameterized by the trader, in order to execute specific trades for a specific stock, price and number of shares. In these embodiments, the algorithm plug-in used is usually consistently used for that implementation of the embodiment during that particular trading period—whether it be an hour, day, week, etc. Of course, other embodiments may change their algorithm during any particular trading period. Moreover, the especially preferred embodiments usually maintain the market plug-in for at least the trading period, and usually longer. A trader, for example, may trade exclusively on the New York Stock Exchange using a preferred embodiment. Note that, using the especially preferred embodiments, the trader will change the algorithm plug-in, embodying his or her trading strategy, much more frequently than his or her market plug-in, as he or she may only trade in a particular market. Network or enterprise wide implementations, however, will use the market plug-in in order to configure any particular implementations for traders in the various trading markets.

This embodiment also effectively provides real-time monitoring of the order by the trader as well as others such as the sales force who desire to monitor the order and its execution. Additionally, orders are fully integrated, and so the trader or others may override individual orders through the system of this embodiment, without an additional messaging system. Similarly, any changes to an order, such as size of the order or a price limit or volume can be echoed to the system of this embodiment and the system will automatically adjust its trading to the new parameters.

Figure 3:
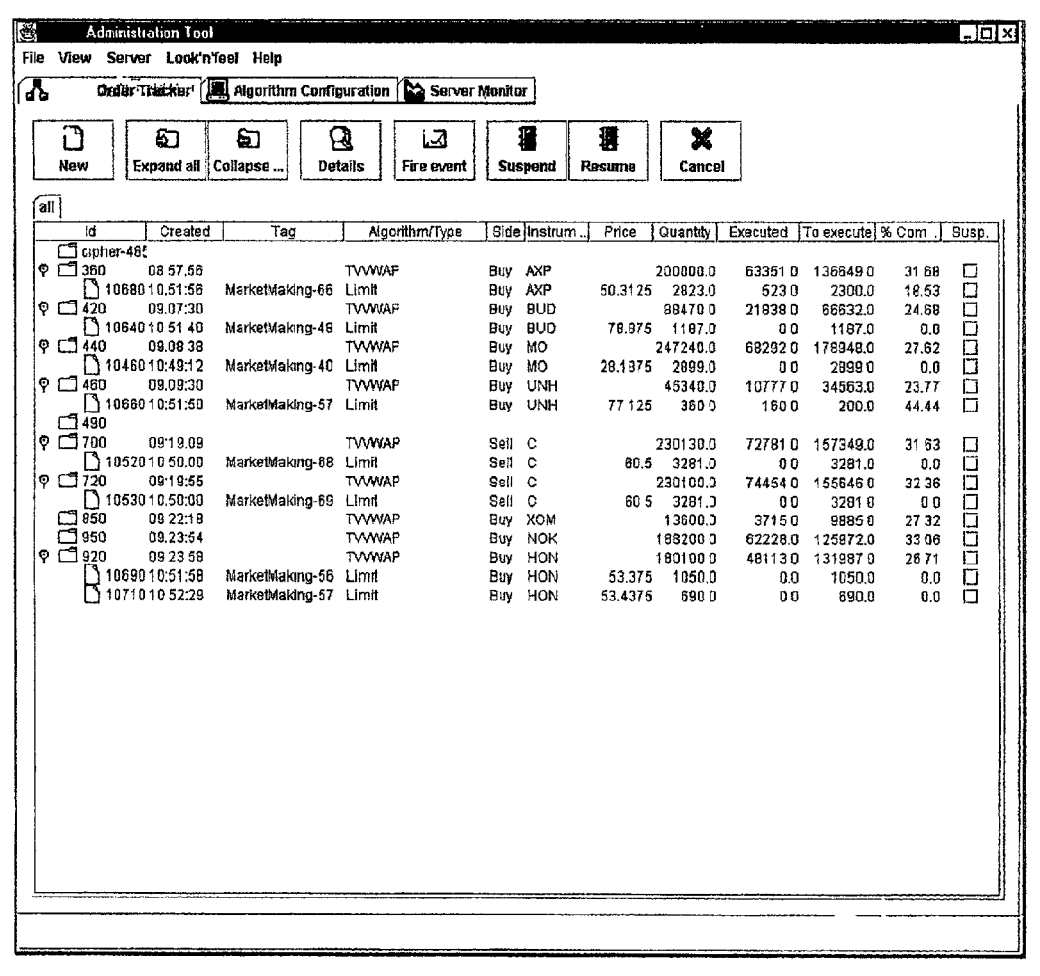
Figure 4:
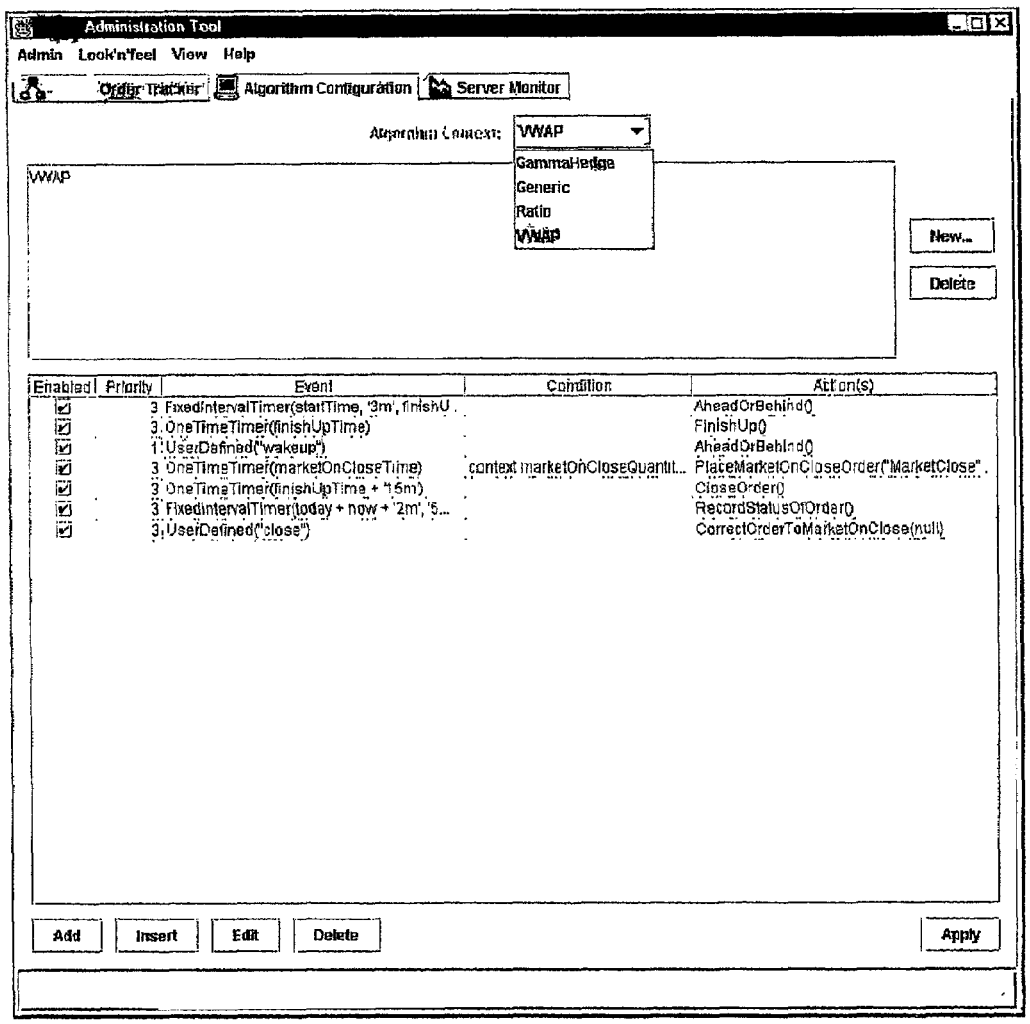
FIG. 4 is a screen shot of a preferred embodiment.
Figure 5:
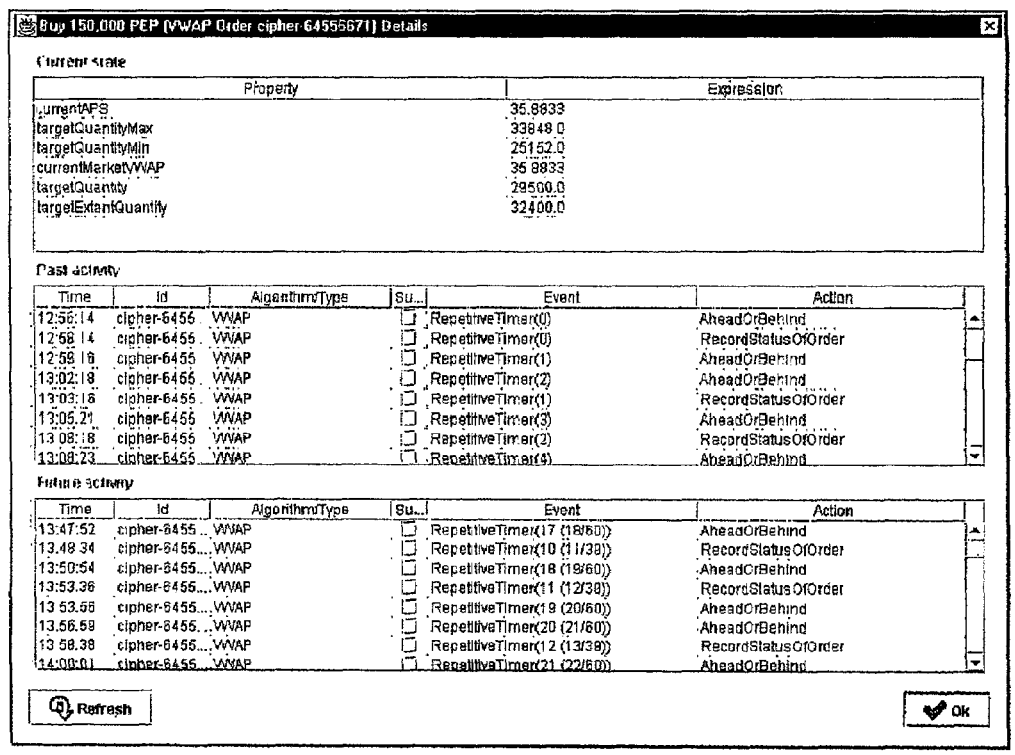
FIG. 5 is a screen shot of a preferred embodiment.

Various screen shots of the administration and monitoring tool GUI (written in Java®, using Swing) used in a preferred embodiment are shown at FIGS. 3 through 5. These are an Order Tracker screen shown in FIG. 3, an Algorithm Configuration screen shown in FIG. 4, and an Order Details screen shown in FIG. 5. This tool allows for configuring algorithms as well as monitoring the server. This tool may be installed on either or both of the client and server machines and on more than one machine in the networked environment.

In the preferred embodiments, an algorithm is comprised of an Algorithm Context, which may be a Java® Class, plus a set of event-action mappings. These algorithms are usually written by a programmer. The mappings may be modified by non-programmers (e.g. a trader) via the graphical tool. The mappings provide a powerful way to fine tune the algorithm. Of course other embodiments may modify the mappings in a different fashion. For example, the programmer may provide the trader or other end user with objects that constitute events, conditions and actions. The trader can then construct his or her own algorithms which are plugged into the invention in order to provide the trader with an automatic execution mechanism.

Other algorithms that may be used in this embodiment include:

Ratio which tries to buy an instrument and sell a related instrument when the price between the two is more favorable than a specified ratio.

Gamma Hedge which hedges a portfolio and tries to capture volatility while doing so.

Aggressive Short Sell which tries to short sell a given instrument by making sure the Tokyo short sell rule is not violated.

Stop Loss which allows sending stop loss orders to exchanges that do not support this concept.

Iceberg which tries to trade a specified number of shares by sending only a part of the total order's quantity (the tip of the iceberg) to the market at any given time.

Auto Trader which decides whether to send trades to the market or fill from an account.

CB Delta Hedge which sends out underlier market orders to hedge CB trades.

Of course, other algorithms or plug-ins may be used. Additionally, in the preferred embodiments, preferred methods of constructing and implementing new plug-ins are used. The preferred embodiments also use several Java® features, e.g. introspection, reflection and the like, in order to automatically discover properties of the imported algorithms.

If new algorithms are desired, a number of methods can be used to create the algorithm. In this embodiment, if the new algorithm requires no Java® code, then the algorithm can be created by leveraging on existing algorithm context classes. Specific classes have been established or predetermined in the preferred embodiments. If the new algorithm is simple enough, it can be created without writing any Java® code, making use of the Administrator GUI. This can be done by simply creating a set of event-action mappings that will work on a pre-existing algorithm context class (e.g. the base AlgorithmContext class that is part of the preferred embodiments core classes).

Figure 6:
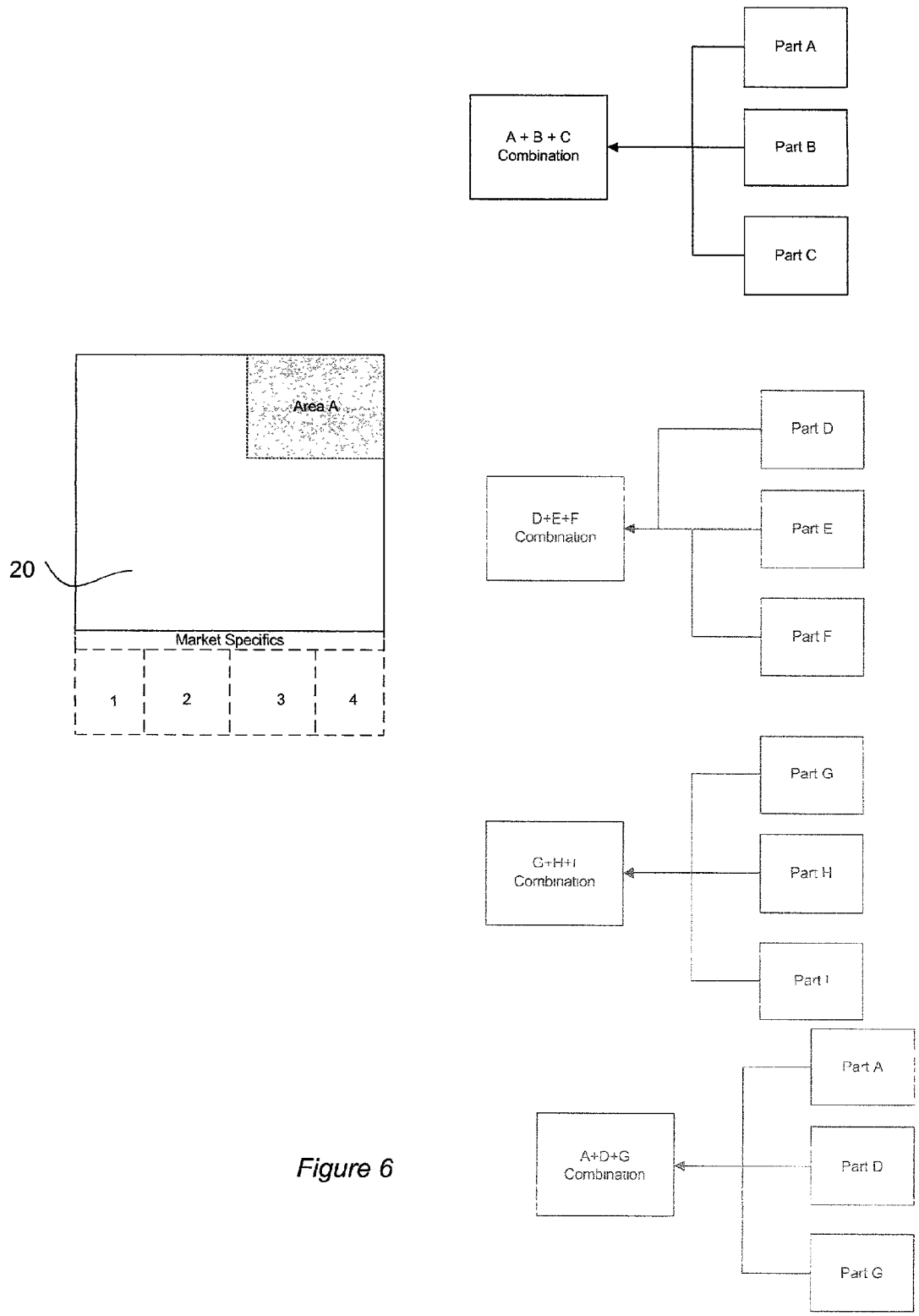
FIG. 6 is a schematic diagram of a preferred embodiment.
Figure 7:
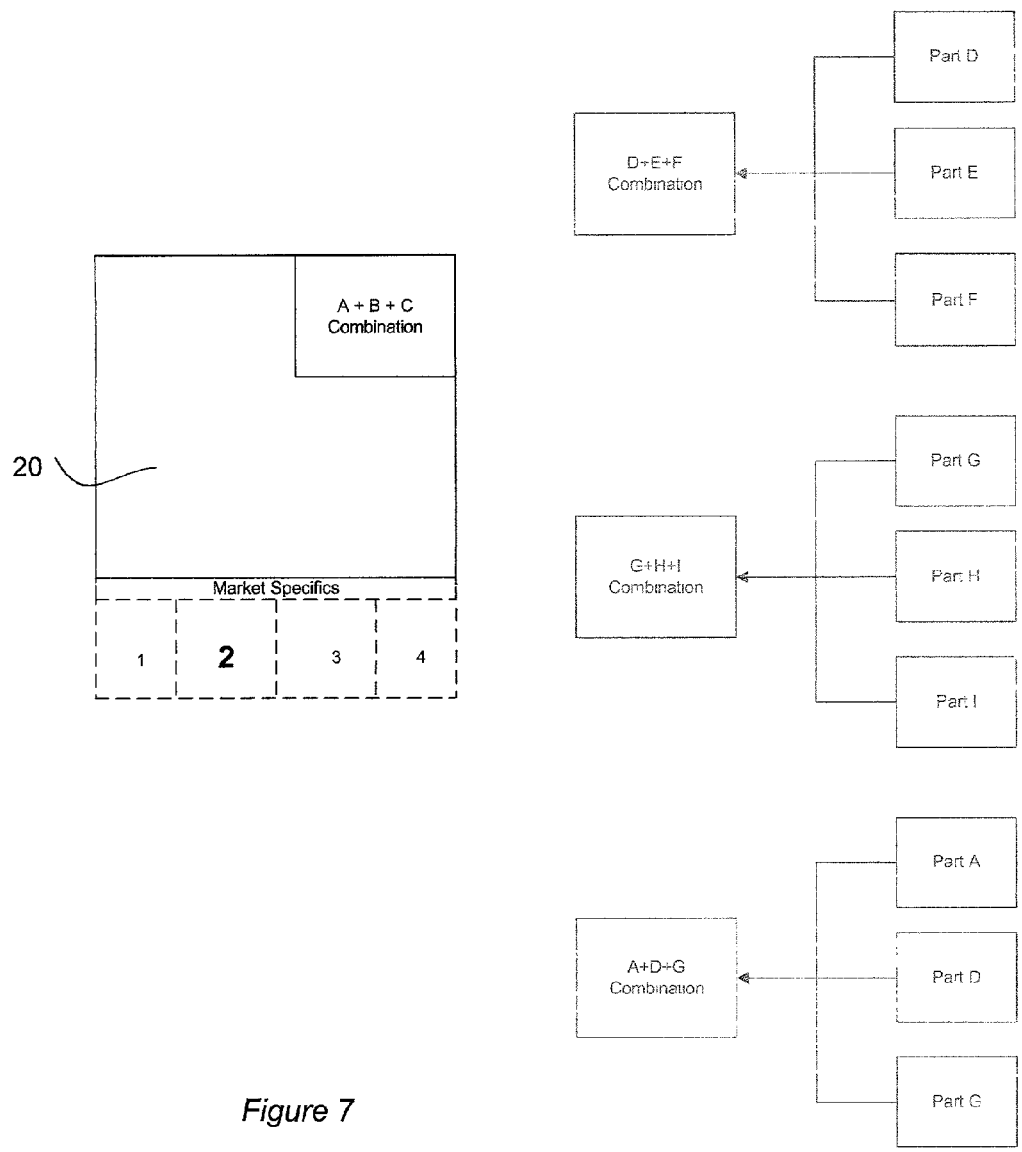
FIG. 7 is a schematic diagram of a preferred embodiment.

FIGS. 6 and 7 show how various mappings or parts may be used to construct combinations. Those combinations, constructed in FIG. 6, are then inserted into the engine 20 in FIG. 7. Note that a different Market Specifics plug-in, Market Specifics 2, has been chosen in FIG. 7. These Market Specifics plug-ins may be from a predetermined set. In the especially preferred embodiments, the market plug-in is usually maintained over some static trading period. A trader, for example, may trade exclusively on the New York Stock Exchange, using the market plug-in. In enterprise installations, the market plug-ins may be set for the particular trading markets across the enterprise, and remain as set for a predetermined or static period of time. The algorithm used may be parameterized by the trader or another, as is explained below, in order to execute specific trades for a specific stock, price and number of shares.

The market type of plug in and the algorithm type of plug in are usually preconfigured and supplied to the user. If the market plug in is preconfigured and supplied to the user, it will, in most embodiments, be maintained in that embodiment. For example, an embodiment that is installed in an office that specializes in trades on the Tokyo Stock Exchange will have a Tokyo Stock Exchange plug in preconfigured therein. This embodiment will then be maintained with the Tokyo market plug in. Another embodiment may be installed in an office that trades on the New York Stock Exchange. This embodiment will have a New York Stock Exchange plug in. Of course, an office or location may trade in numerous instruments, on numerous exchanges, and/or may change the exchange it specializes in. In those offices, embodiments may be used that change the Market plug in as desired.

If the algorithm plug in is preconfigured and supplied to the user, it will, in most embodiments, be changed more frequently than the Market plug in. Any change from the preconfigured algorithm in the engine to a new algorithm in the engine can occur in a number of ways in the preferred embodiment. Before describing those in detail, it would be helpful to review the parameterization of any particular algorithm.

Parameterization of an algorithm involves providing the necessary information in order to execute specific trades for a specific stock, price and number of shares. For example, assume a trader desires to execute a specific trade:

BUY 10,000 shares of SUN and SELL 15,000 shares of Microsoft whenever the Price Ratio between the two exceeds 1.2.

This is known as a "Ratio" trade, and will be executed through use of the Ratio algorithm plug in. Assuming for this example, the Ratio plug in is preconfigured in the embodiment, the parameters, including "BUY" "SUN" "10,000"; "SELL" "MICROSOFT" "15,000"; as well as the Ratio parameter "1.2," will have to be input. Parameter Input can occur in two ways in the preferred embodiment.

The first method of parameter input is through altering the event-action parameters. Recall from above that, in the preferred embodiments, the algorithm is comprised of an event-action pair. Thus one way to parameterize an algorithm is to set the events and actions that comprise the algorithm's properties.

For example, in the above SUN-Microsoft example order using the Ratio algorithm: BUY 10,000 SUNW and SELL 15,000 MSFT whenever the Ratio between the two exceeds 1.2; the order can be deconstructed into two separate Actions to be parameterized, i.e. buying 10,000 shares of Sun and selling 15,000 shares of Microsoft, whenever a certain Event happens (the price of Sun over Microsoft exceeds 1.2.)

The preferred embodiments do not link this event action setting to the user interface. Thus, any parameterization by this method will be done by a programmer who will change the properties of the Event and Action object, and so either create a new or modified object.

The second method used for parameterization permits user or trader parameterization through a GUI or other interface by inputting the desired parameters of the events and actions. This user driven parameterization modifies the association or list of associations between an event and one or more actions. This association or these associations between event and action are called action bindings and are described in further detail below.

Once the algorithm is configured with either method of parameterization, that is, using either the action method or action binding method, trades occur using the logic engine, etc. of the preferred embodiments. Of course, either method might be used to change the parameters of the particular plug in might also be changed. For example, the trader might desire to change the Ratio plug in used in the above example, from:

BUY 10,000 shares of SUN and SELL 15,000 shares of Microsoft whenever the Price Ratio between the two exceeds 1.2.

to:

BUY 10,000 shares of IBM and SELL 15,000 shares of Microsoft whenever the Price Ratio between the two exceeds 1.2.

The desired parameterization method will then be used to change the appropriate parameters of the algorithm plug in.

Parameterization of a preconfigured algorithm plug in may be thought of as one type of customization available to the user. Other types are:

1) Changing the preconfigured algorithm plug in in the engine to a new algorithm plug in;
2) Constructing a new algorithm plug in through modifying a preexisting algorithm plug in;
3) Constructing a new algorithm plug in; and,
4) Constructing new events, actions, and other components, which are the tools to construct an algorithm.

The first two customization types, 1) Changing the preconfigured algorithm plug in in the engine to a new algorithm plug in, either preexisting or newly constructed; and 2) Constructing a new algorithm plug in through modifying a preexisting algorithm plug in, are primarily accomplished, in the preferred embodiments, through use of the algorithm configuration interface of FIG. 4. The interface is described further in co-pending U.S. patent application Ser. No. 09/773,139, entitled "APPARATUS, METHODS AND ARTICLES OF MANUFACTURE FOR CONSTRUCTING AND EXECUTING COMPUTERIZED TRANSACTION PROCESSES AND PROGRAMS."

The second two customization types, 3) Constructing a new algorithm plug in; and 4) Constructing new events, actions and AlgorithmContexts, which are the tools to construct an algorithm, are accomplished in the preferred embodiment by use of the objects of the preferred embodiment. Before describing these customization types in detail, it would be helpful to further describe some of the library, package, class, and other attributes of the preferred embodiments.

The preferred embodiments provide a library of a number of packages of classes comprising:

an Algorithm package;
an Event package system;
an Action package;
an Exchange package;
an Input package;
a Local package;
a Logic package;
a Tools package; and
a Finutil package.

The Action package comprises the group of actions that are taken by the logic engine on an order. Actions include but are not limited to buying, selling, canceling, etc.

The Event package comprises the events that the logic engine looks for, before implementing the Action. Events are matched with Actions in order to create custom trading strategy algorithms, such as was seen above in the SUN-Microsoft example.

The Algorithm package comprises preconfigured algorithm plug ins. These plug ins are applied to the logic engine. For example, a preconfigured algorithm, in the preferred embodiments, implements the Ratio algorithm referred to above.

The Input package comprise objects that implement input drivers for the logic engine. Input drivers interface with the logic engine from other applications, such ordering feeds and the like.

The Exchange package comprise Exchange drivers for the logic engine. Exchange drivers also interface with the logic engine for transmitting information and orders to external applications.

The Local package comprises preconfigured market plug ins. These plug ins are applied to the logic engine.

The Logic package comprises logic engine implementation classes.

The Tools package comprise administrative tools, as well as other miscellaneous classes, for example, testing tools, etc.

The Finutil package contains financial application utility classes, which include both generic instruments objects, representing stocks, bonds, etc. as well as data feed specific objects that represent properties for various instruments.

This preferred embodiment library and its packages can be used as a toolkit to construct new algorithm plug ins, and, new events, actions, and other components, which are the tools to construct an algorithm.

A new algorithm plug in can be constructed through modifying an existing algorithm, or can be constructed anew. In the former instance, as explained above, the interfaces can be used in the especially preferred embodiments, in manner or manners explained in co-pending U.S. patent application Ser. No. 09/773,139, entitled "APPARATUS, METHODS AND ARTICLES OF MANUFACTURE FOR CONSTRUCTING AND EXECUTING COMPUTERIZED TRANSACTION PROCESSES AND PROGRAMS."

If the algorithm requires being constructed anew, or new code, the algorithm can be constructed from existing components, or those components can be written anew, or the algorithm can be constructed from a combination of new and old components. Recall that in the preferred embodiments an algorithm is comprised of an Algorithm Context, which may be a Java® Class, plus a set of event-action mappings.

Therefore, if the new algorithm requires writing new code, the process of the preferred embodiment begins with writing a new AlgorithmContext class. An AlgorithmContext is created from the class when the algorithm is implemented in the engine, in the manner or manners described in co-pending U.S. patent application Ser. No. 09/823,125 entitled "APPARATUS, METHODS AND ARTICLES OF MANUFACTURE FOR CONSTRUCTING AND EXECUTING COMPUTERIZED TRANSACTION PROCESSES AND PROGRAMS" filed on Mar. 30, 2001, by Heman G. Otero, Steven B. Horn and John Tumilty.

Writing a new AlgorithmContext starts with a template of what the class should look like, providing an empty, public constructor, adding in member variables, and providing multiple public getter/setter pairs (one for each of the desired properties.)

The next step is to create new Action classes or use preexisting Action classes. In either event, the Action class must be constructed with the same logic as the AlgorithmContext in order to function properly within the Context.

The new algorithm is then placed in the appropriate directory. The Java language used in the preferred embodiments requires that classes be placed in a directory structure which corresponds to the package structure of the class, and so the new algorithm should be placed appropriately.

After the classes described above are constructed, and the embodiments run, ActionBindings, which map the Events classes to the preexisting or newly created Action classes, can be created in number of ways. In the preferred embodiment, this mapping occurs through an administrative GUI. Optionally, a condition may be created, to use as a filter and the like.

It is important to note that, in the preferred embodiments, traders provide vital feedback and oversight. Moreover, the embodiments evolve through use. There may be a lengthy tuning and feedback phase of algorithm development. The embodiments fit within a scalable architecture, and as the algorithms become more complex and widely used, the embodiments adapt and scale. Additionally, the embodiments must have fast Release Cycles. The preferred embodiments are flexible and separate the algorithm from the engine. Also, the algorithm should be as orthogonal as possible to the rest of the system. By use of this structure in the preferred embodiments, the embodiments can be used to trade and transact across virtually any instruments or exchanges.

In the preferred embodiments, the algorithms are tested for use. Of course, in other embodiments testing may not be desired. There are two main testing stages in a preferred embodiment. The first stage involves soliciting feedback with the traders and salespeople using the algorithm. The algorithm will not work right the first time, situations will not have been thought of, parameters will be wrong, failsafes will not be good enough and so on. The feedback at this early stage of development ensures not only a quick release but also that modifications can be made in situ.

The second stage of testing in this embodiment involves the continued evolution and updating of an algorithm once it is in production. It is important to have a very extensive series of tests that cover a multitude of trading situations. When changes are made to an algorithm, no matter how slight, every test is run and verified. This is necessary for production systems with a large number of users. Without high confidence that any changes made will not have any unforeseen follow-on effects, the release cycle becomes intolerably long. Of course, other embodiments may utilize different testing methods, including providing sample market feeds rather than real time feeds. The term "executing a trade" and its variants as used herein is meant to cover both actual and simulated execution of a trade.

The preferred embodiments implement a recovery mechanism, which assists the programmer in analyzing and/or recovering from crashes. The recovery process restores execution of orders by taking a number of steps. Those steps comprise:

Recovering the state of the orders. This involves rebuilding the order hierarchy (parent/child relationships, executed quantities, etc.) as it existed prior to the crash.

Recovering the exchange information. This involves making sure that all executions/corrections/cancellations that might have been pending when the embodiment crashed and had taken place during its blackout now get reflected in the embodiment's order hierarchy. This is done so that future algorithm decisions get based on the current state of the world, and not the one present before the crash.

Restarting all algorithms. This is now possible since the algorithms will have their information up-to-date in order to make correct decisions on how to continue their execution. Depending on the complexity of the algorithms involved, this step may be as simple as setting up the event-action mappings for the algorithm context.

The recovery process in this embodiment includes writing to log or journal file. Of course other embodiments may have other recovery processes or recovery steps.

Figure 8:
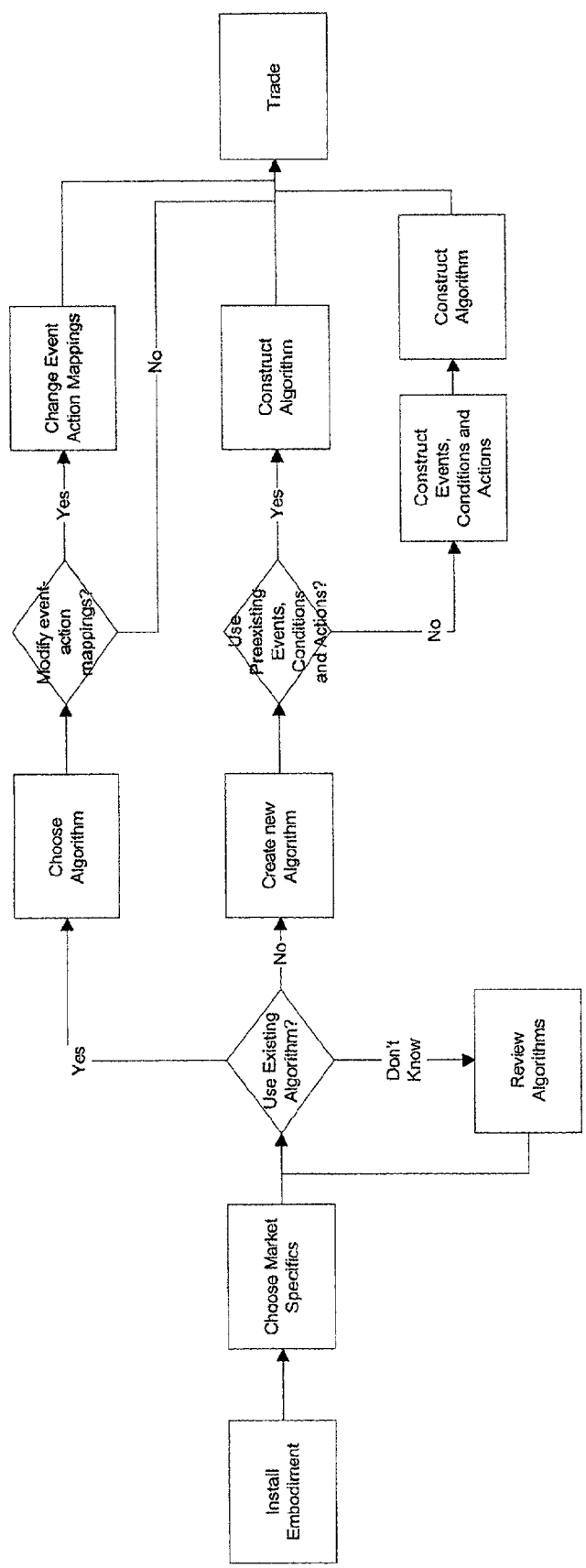
FIG. 8 is a flow chart of a preferred embodiment.
Figure 9:
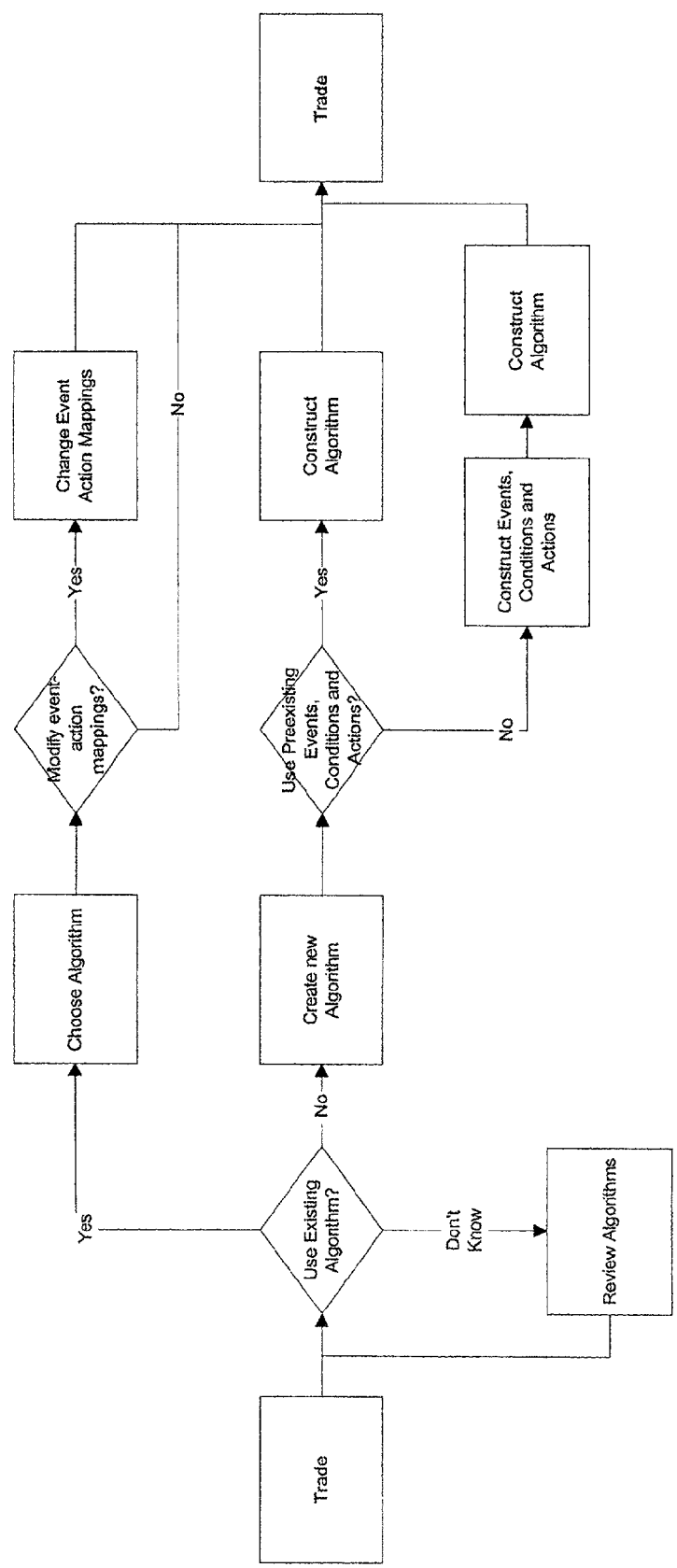
FIG. 9 is a flow chart of a preferred embodiment.
Figure 10:
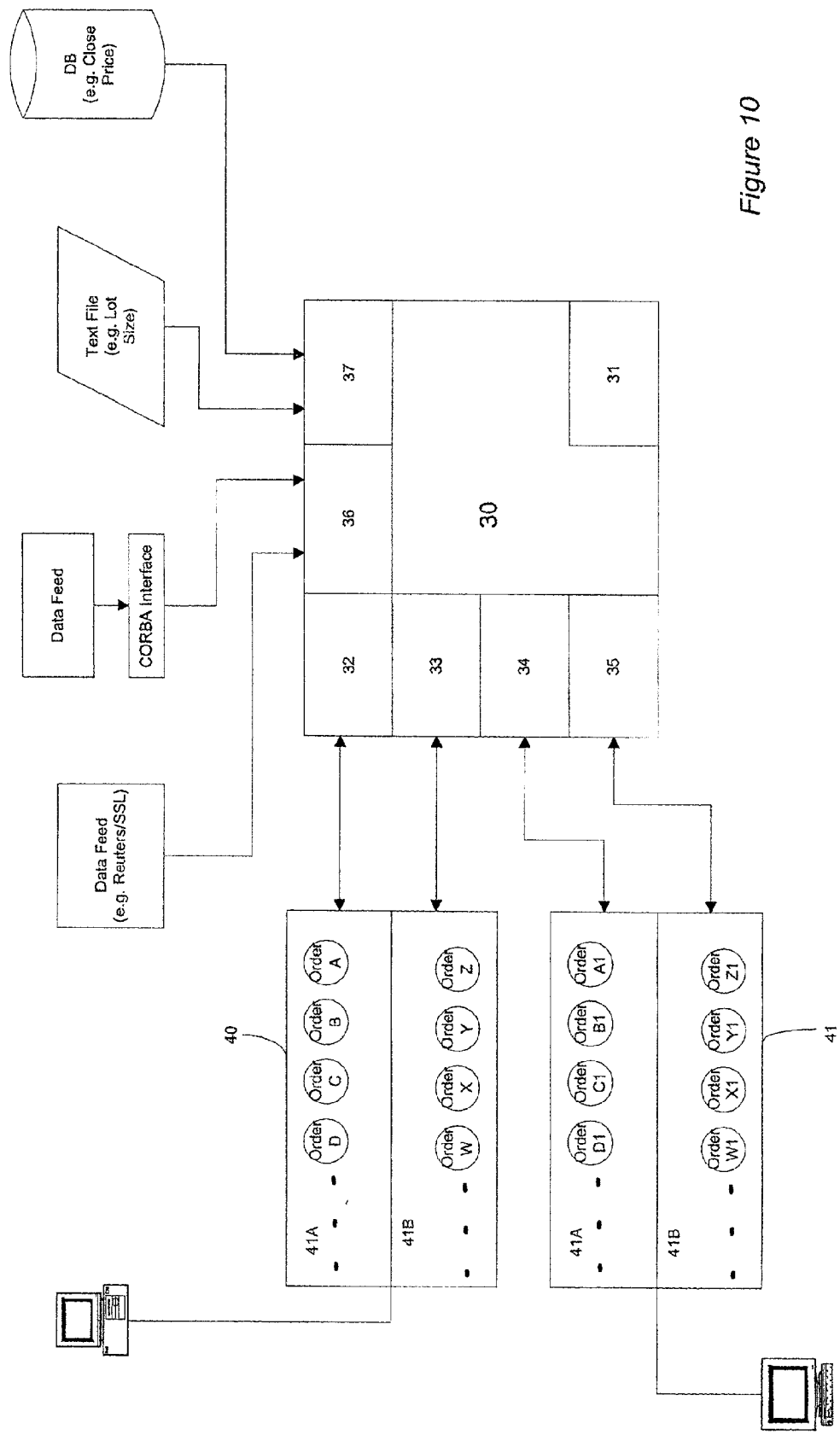
FIG. 10 shows components of a preferred embodiment.

FIG. 8 provides a flowchart summarizing processes of a preferred embodiment, from installation to trading. FIG. 9 provides a flowchart summarizing a process for changing a plug-in. Other embodiments may have these processes or other processes with the same or similar steps in these or other orders.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. An apparatus for computerized trading comprising:
a first algorithm plug-in for implementing a first trading strategy,
a first market plug-in for carrying out trades in a first market,
an engine for providing services to said first algorithm plug-in and said first market plug-in, whereby said first algorithm plug-in and said first market plug-in are implemented in said engine in order to execute a trade,
a second algorithm plug-in for implementing a second trading strategy that is different from said first trading strategy and for selectively being implemented in said engine in substitution for said first algorithm plug-in,
a second market plug-in for carrying out trades in a second market that is different from said first market and for selectively being implemented in said engine in substitution for said first market plug-in,
means for substituting either of said second algorithm plug-in or said second market plug-in for either of said first algorithm plug-in or said first market plug-in respectively, in said engine,
wherein each of said plug-ins and said engine are comprised of one or more object classes,
said engine carrying out trades in accordance with either the first trading strategy or the second trading strategy and in accordance with rules of the first market or the second market.

2. An apparatus as in claim 1 wherein said implementation of said plug-ins further comprises implementation of at least one parameterized plug-in.

3. An apparatus as in claim 1 wherein said plug-ins are selected from a predetermined group of plug-ins.

4. An apparatus as in claim 1 wherein said algorithm plug-ins further comprise events and actions.

5. An apparatus as in claim 4 wherein said events and actions are selected from a predetermined group of events and actions.

6. An apparatus as in claim 5 wherein said events and actions comprise Java classes.

7. An apparatus as in claim 1 wherein said second algorithm plug-in is comprised of a modified third algorithm plug-in.

8. An apparatus as in claim 7 wherein said third algorithm plug-in is comprised of said first algorithm plug-in.

9. A method for computerized trading comprising:
providing a first algorithm plug-in for implementing a first trading strategy,
providing a first market plug-in for carrying out trades in a first market,
providing an engine for providing services to either of said first algorithm plug-in or said first market plug-in,
implementing said first algorithm plug-in and said first market plug-in in said engine,
providing a second algorithm plug-in for implementing a second trading strategy that is different from said first trading strategy and for selectively being implemented in said engine in substitution for said first algorithm plug-in,
providing a second market plug-in for carrying out trades in a second market that is different from said first market and for selectively being implemented in said engine in substitution for said first market plug-in,
substituting either of said second algorithm plug-in or said second market plug-in for either of said first algorithm plug-in or said first market plug-in respectively, in said engine, in order to execute a trade, and wherein each of said plug-ins and said engine are comprised of one or more object classes, and
carrying out trades in accordance with either the first trading strategy or the second trading strategy and in accordance with rules of the first market or the second market.

10. A method as in claim 9 wherein the step of implementing said first algorithm plug-in and said first market plug-in in said engine further comprises implementing at least one parameterized plug-in.

11. A method as in claim 9 wherein the step of substituting either of said second algorithm plug-in or said second market plug-in for either of said first algorithm plug-in or said first market plug-in respectively, in said engine, in order to execute a trade, further comprises parameterizing the substituted plug-in.

12. A method as in claim 9 further comprising the step of selecting said plug-ins from a predetermined group of plug-ins.

13. A method as in claim 9 further comprising the step of constructing said algorithm plug-ins from a group of events and actions.

14. A method as in claim 13 further comprising the step of selecting said events and actions from a predetermined group of events and actions.

15. A method as in claim 13 further comprising the step of selecting said plug-ins from a predetermined group of said events and actions comprised of Java classes.

16. A method as in claim 9 further comprising the step of modifying a third algorithm plug-in to construct, at least in part, said second algorithm plug-in.

17. A method as in claim 16 wherein said third algorithm plug-in is comprised of said first algorithm plug-in.

18. A method for computerized trading, comprising:
providing a plurality of algorithm plug-ins, each of the algorithm plug-ins for implementing a respective trading strategy from a plurality of trading strategies, all of the trading strategies being different from each other;
providing a plurality of market plug-ins, each of the market plug-ins for implementing rules for a respective market from a plurality of markets, all of the markets being different from each other;
selecting one of the algorithm plug-ins;
selecting one of the market plug-ins;
configuring an engine with the selected one of the algorithm plug-ins and with the selected one of the market plug-ins, the engine being for providing to the selected one of the algorithm plug-ins access to market data and for sending orders on behalf of the selected one of the algorithm plug-ins and for receiving notification of executions of orders on behalf of the selected one of the algorithm plug-ins; and
carrying out trades using the configured engine in accordance with the trading strategy implemented by the selected one of the algorithm plug-ins and in accordance with market rules implemented by the selected one of the market plug-ins;

wherein each of said plug-ins and said engine comprise one or more object classes.

19. A method as in claim 18, wherein a first one of said market plug-ins implements a first limit on trading volume and a second one of said market plug-ins implements a second limit on trading volume, the second limit being different from the first limit.

20. A method as in claim 18, wherein the plurality of trading strategies implemented respectively by said algorithm plug-ins comprise at least two of the group of trading strategies consisting of: (a) a volume-weighted-average-price strategy; (b) a ratio strategy in which a first instrument is bought and a related instrument is sold in response to a certain ratio between respective prices of the first instrument and the related instrument; (c) a hedging strategy; (d) a short selling strategy; (e) a stop loss strategy; (t) an "iceberg" strategy in which a part that is less than all of an order is sent to market at any given time; and (g) an auto trader strategy to determine whether a trade is to be sent to market or filled from an account.

21. A method as in claim 20, wherein the plurality of trading strategies implemented respectively by said algorithm plug-ins comprise at least three of the group of trading strategies consisting of: (a) a volume-weighted-average-price strategy; (b) a ratio strategy in which a first instrument is bought and a related instrument is sold in response to a certain ratio between respective prices of the first instrument and the related instrument; (c) a hedging strategy; (d) a short selling strategy; (e) a stop loss strategy; (f) an "iceberg" strategy in which a part that is less than all of an order is sent to market at any given time; and (g) an auto trader strategy to determine whether a trade is to be sent to market or filled from an account.

22. A method as in claim 21, wherein the plurality of trading strategies implemented respectively by said algorithm plug-ins comprise at least four of the group of trading strategies consisting of: (a) a volume-weighted-average-price strategy; (b) a ratio strategy in which a first instrument is bought and a related instrument is sold in response to a certain ratio between respective prices of the first instrument and the related instrument; (c) a hedging strategy; (d) a short selling strategy; (e) a stop loss strategy; (t) an "iceberg" strategy in which a part that is less than all of an order is sent to market at any given time; and (g) an auto trader strategy to determine whether a trade is to be sent to market or filled from an account.

23. A method as in claim 18, further comprising:
parameterizing the selected one of the algorithm plug-ins to execute at least one trade.

24. A method as in claim 18, wherein the selecting of one of the algorithm plug-ins includes selecting a selection from a pull-down menu.

25. An apparatus for computerized trading comprising:
a plurality of algorithm plug-ins, each of the algorithm plug-ins for implementing a respective trading strategy from a plurality of trading strategies, all of the trading strategies being different from each other;
a plurality of market plug-ins, each of the market plug-ins for implementing rules for a respective market from a plurality of markets, all of the markets being different from each other;
an engine configured with a selected one of the algorithm plug-ins and with a selected one of the market plug-ins, the engine being for:

providing to the selected one of the algorithm plug-ins access to market data;
sending orders on behalf of the selected one of the algorithm plug-ins;
receiving notification of executions of orders on behalf of the selected one of the algorithm plug-ins; and
carrying out trades using the configured engine in accordance with the trading strategy implemented by the selected one of the algorithm plug-ins and in accordance with market rules implemented by the selected one of the market plug-ins;
wherein each of said plug-ins and said engine comprise one or more object classes.

26. An apparatus as in claim 25, wherein a first one of said market plug-ins implements a first limit on trading volume and a second one of said market plug-ins implements a second limit on trading volume, the second limit being different from the first limit.

27. An apparatus as in claim 25, wherein the plurality of trading strategies implemented respectively by said algorithm plug-ins comprise at least two of the group of trading strategies consisting of: (a) a volume-weighted-average-price strategy; (b) a ratio strategy in which a first instrument is bought and a related instrument is sold in response to a certain ratio between respective prices of the first instrument and the related instrument; (c) a hedging strategy; (d) a short selling strategy; (e) a stop loss strategy; (f) an "iceberg" strategy in which a part that is less than all of an order is sent to market at any given time; and (g) an auto trader strategy to determine whether a trade is to be sent to market or filled from an account.

28. An apparatus as in claim 27, wherein the plurality of trading strategies implemented respectively by said algorithm plug-ins comprise at least three of the group of trading strategies consisting of: (a) a volume-weighted-average-price strategy; (b) a ratio strategy in which a first instrument is bought and a related instrument is sold in response to a certain ratio between respective prices of the first instrument and the related instrument; (c) a hedging strategy; (d) a short selling strategy; (e) a stop loss strategy; (f) an "iceberg" strategy in which a part that is less than all of an order is sent to market at any given time; and (g) an auto trader strategy to determine whether a trade is to be sent to market or filled from an account.

29. An apparatus as in claim 28, wherein the plurality of trading strategies implemented respectively by said algorithm plug-ins comprise at least four of the group of trading strategies consisting of: (a) a volume-weighted-average-price strategy; (b) a ratio strategy in which a first instrument is bought and a related instrument is sold in response to a certain ratio between respective prices of the first instrument and the related instrument; (c) a hedging strategy; (d) a short selling strategy; (e) a stop loss strategy; (f) an "iceberg" strategy in which a part that is less than all of an order is sent to market at any given time; and (g) an auto trader strategy to determine whether a trade is to be sent to market or filled from an account.

30. An article for executing computerized trading comprising:
a computer-readable signal bearing medium;
means in the medium for providing a plurality of algorithm plug-ins, each of the algorithm plug-ins for implementing a respective trading strategy from a plurality of trading strategies, all of the trading strategies being different from each other;
means in the medium for providing a plurality of market plug-ins, each of the market plug-ins for implementing rules for a respective market from a plurality of markets, all of the markets being different from each other;

means in the medium for selecting one of the algorithm plug-ins;

means in the medium for selecting one of the market plug-ins;

means in the medium for configuring an engine with the selected one of the algorithm plug-ins and with the selected one of the market plug-ins, the engine being for providing to the selected one of the algorithm plug-ins access to market data and for sending orders on behalf of the selected one of the algorithm plug-ins and for receiving notification of executions of orders on behalf of the selected one of the algorithm plug-ins; and means in the medium for carrying out trades using the configured engine in accordance with the trading strategy implemented by the selected one of the algorithm plug-ins and in accordance with market rules implemented by the selected one of the market plug-ins;

wherein each of said plug-ins and said engine comprise one or more object classes.

* * * * *